(12) United States Patent
Watanabe et al.

(10) Patent No.: US 8,464,604 B2
(45) Date of Patent: Jun. 18, 2013

(54) ACCELERATOR PEDAL MODULE

(75) Inventors: Hidekazu Watanabe, Aichi-gun (JP);
Tetsuo Hariu, Kariya (JP); Haruhiko Suzuki, Anjo (JP)

(73) Assignee: Denso Corporation, Kariya (JP)

( * ) Notice: Subject to any disclaimer, the term of this patent is extended or adjusted under 35 U.S.C. 154(b) by 928 days.

(21) Appl. No.: 12/259,370

(22) Filed: Oct. 28, 2008

(65) Prior Publication Data

US 2009/0183589 A1    Jul. 23, 2009

(30) Foreign Application Priority Data

Jan. 18, 2008  (JP) .................................. 2008-9070

(51) Int. Cl.
*G05G 1/30*  (2008.04)

(52) U.S. Cl.
USPC .............................................. 74/513; 74/560

(58) Field of Classification Search
USPC ........... 74/512–514, 560, 561, 569; 200/86.5, 200/61.89; 267/170–174, 178, 179, 248–253, 267/255
See application file for complete search history.

(56) References Cited

U.S. PATENT DOCUMENTS

| | | | | |
|---|---|---|---|---|
| 2,100,689 A | * | 11/1937 | Dubonnet | 267/250 |
| 4,617,883 A | * | 10/1986 | Okuyama et al. | 123/90.44 |
| 5,186,130 A | * | 2/1993 | Melchior | 74/569 |
| 5,653,426 A | * | 8/1997 | Meisel | 267/71 |
| 6,263,758 B1 | * | 7/2001 | Kumamoto et al. | 74/513 |
| 6,857,336 B2 | * | 2/2005 | Staker | 74/513 |
| 7,216,563 B2 | * | 5/2007 | Willemsen et al. | 74/512 |
| 2002/0152831 A1 | * | 10/2002 | Sakamoto et al. | 74/512 |
| 2005/0178234 A1 | * | 8/2005 | Saito et al. | 74/513 |
| 2005/0183535 A1 | * | 8/2005 | Makino et al. | 74/513 |
| 2007/0137399 A1 | * | 6/2007 | Willemsen et al. | 74/513 |
| 2007/0193396 A1 | * | 8/2007 | Schlabach | 74/512 |
| 2008/0184843 A1 | | 8/2008 | Klotzbuecher et al. | |

FOREIGN PATENT DOCUMENTS

| | | |
|---|---|---|
| DE | 10 2005 013 442 | 9/2006 |
| JP | 58-31481 | 8/1983 |
| JP | 59-128483 | 8/1984 |
| JP | 11-037335 | 2/1999 |
| JP | 2004-114884 | 4/2004 |
| WO | WO2006/100133 | 9/2006 |

OTHER PUBLICATIONS

Japanese Office Action dated Dec. 3, 2009, issued in corresponding Japanese Application No. 2008-009070, with English translation.

* cited by examiner

*Primary Examiner* — Phillip A Johnson
*Assistant Examiner* — Daniel Yabut
(74) *Attorney, Agent, or Firm* — Nixon & Vanderhye PC

(57) ABSTRACT

An accelerator pedal is engaged with the rotor so that the accelerator pedal is pivotable about a rotation axis. A coil spring is arranged on a biasing axis that is generally tangential to an arc path, along which a protrusion of the rotor passes when the rotor rotates about the rotation axis. A holder is interposed between the protrusion of the rotor and the coil spring. A concave surface of the holder contacts a convex surface of the protrusion. A receiving portion of the holder receives the coil spring. The contact point is located between a second end and a first end of the coil spring. The concave surface of the holder and the convex surface of the protrusion are curved to satisfy a predetermined relationship.

5 Claims, 7 Drawing Sheets

ACCELERATOR PEDAL MODULE

CROSS REFERENCE TO RELATED APPLICATION

This application is based on and incorporates herein by reference Japanese Patent Application No. 2008-009070 filed on Jan. 18, 2008.

BACKGROUND OF THE INVENTION

1. Field of the Invention

The present invention relates to an accelerator pedal module for vehicles.

2. Description of Related Art

Conventionally, an accelerator pedal module, which is mounted on a vehicle to control a driving state of the vehicle in accordance with a pressing amount of an accelerator pedal that is foot-actuated by a driver, is known (see WO2006/100133A1 corresponding to US2008/0184843A1, hereafter referred to as patent document 1, for example). In such an accelerator pedal module, a support member pivotably supports the accelerator pedal that is foot-actuated by a driver, and a spring biases the accelerator pedal in a reverse of a pedaling direction of the accelerator pedal. When a pedal force actuating the accelerator pedal is released, a biasing force of the spring returns the accelerator pedal to its initial position.

In the accelerator pedal module disclosed in patent documents 1, the biasing force of the spring is transmitted to a rotor that is located on a counter-pedal portion side end portion of the accelerator pedal, via a holder, a movement of which is guided by a guide portion. When a driver presses the accelerator pedal, the rotor pushes up the holder against the biasing force of the spring. At this moment, a rotation surface of the rotor moves around an arc about a rotation axis of the accelerator pedal, a position of a contact point of the rotor and the holder shifts, and the holder is inclined to the guide portion. The holder slides on the guide portion, being inclined to the guide portion. Therefore, the holder is worn with time on one side by a sliding movement on the guide portion, to cause jerkiness in a pedal power characteristic. As a result, a pedal operation feeling becomes worse. Therefore, in order to keep the pedal operation feeling good with time, it is desirable that the holder moves without being guided by the guide portion to prevent the holder from being worn on one side.

In this regard, JPH11-37335A, which is hereafter referred to as patent document 2, discloses a construction of a flow control valve, in which a spherical projection member that is supported by a straight cylindrical valve shaft is in contact with a spherical concavity member, and the spherical projection member straightly pushes up the spherical concavity member against a biasing force of a spring. In this flow control valve, a part of the spherical concavity member and a part of the spherical projection member that are in contact with each other have spherical surfaces. Further, a position at which the biasing force of the spring acts on the spherical concavity member is below a contact point of the spherical concavity member and the spherical projection member. Thereby, an orientation of the spherical concavity member is highly stable while the spherical projection member is moving to push the spherical concavity member. Therefore, the flow control valve disclosed in patent document 2 does not require a guide portion as disclosed in patent document 1, in order to guide a movement of the spherical concavity member. Therefore, the spherical concavity member is prevented from being worn on one side.

Thus, it is possible to eliminate the guide portion from the accelerator pedal module, by incorporating the above construction of the flow control valve into the accelerator pedal module, that is, by incorporating a construction of the spherical projection member into the rotor and a construction of the spherical concavity member into the holder, to locate a position at which the biasing force of the spring acts on the holder below a contact point of the holder and the rotor. However, in the accelerator pedal module, the rotation surface of the rotor moves around an arc, and the holder is pushed up against the biasing force of the spring to move along an arc when a driver presses the accelerator pedal. Therefore, a holder side end of the spring moves not along a straight path but along an arc while the spring is compressed. As a result, the operating efficiency of a spring falls, causing a problem to make the pedal operation feeling worse.

SUMMARY OF THE INVENTION

The present invention is made in view of the above-mentioned problem. Thus, it is an objective of the present invention to provide an accelerator pedal module that can minimize abrasion of parts and can keep a good pedal operation feeling.

To achieve the objective of the present invention, there is provided an accelerator pedal module for a vehicle. A support member of the accelerator pedal module is adapted to be fixed to a body of the vehicle. A rotor is supported by the support member to be rotatable about a rotation axis. An accelerator pedal is engaged with the rotor so that the accelerator pedal is pivotable about the rotation axis in a first pivot direction upon application of a pedal force of a driver of the vehicle onto the accelerator pedal. A resilient biasing member has a first end that is received by the support member and is arranged to be compressible on a biasing axis that is generally tangential to an arc path, along which a protrusion of the rotor passes when the rotor rotates about the rotation axis. The resilient biasing member biases the accelerator pedal in a second pivot direction, which is opposite from the first pivot direction. A holder is interposed between the protrusion of the rotor and a second end of the resilient biasing member, which is opposite from the first end of the resilient biasing member. The holder has a concave surface that is located on a central portion of a first side of the holder and contacts a convex surface of the protrusion at a contact point, and a receiving portion that is located on a peripheral portion of a second side of the holder, which is opposite from the first side of the holder, and receives the second end of the resilient biasing member. The contact point is located between the second end and the first end of the resilient biasing member. The concave surface of the holder and the convex surface of the protrusion are curved to satisfy a relationship of $r4 > r3 > r2 > r1$ where:

$r1$ is a radius of curvature of the convex surface of the protrusion, which is measured in a first imaginary plane that contains the contact point and is perpendicular to the rotation axis;

$r2$ is a radius of curvature of the concave surface of the holder, which is measured in the first imaginary plane;

$r3$ is a radius of curvature of the convex surface of the protrusion, which is measured in a second imaginary plane that contains the biasing axis of the resilient biasing member and in parallel with the rotation axis; and $r4$ is a radius of curvature the concave surface of the holder, which is measured in the second imaginary plane.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF PREFERRED EMBODIMENTS

Figure 1:
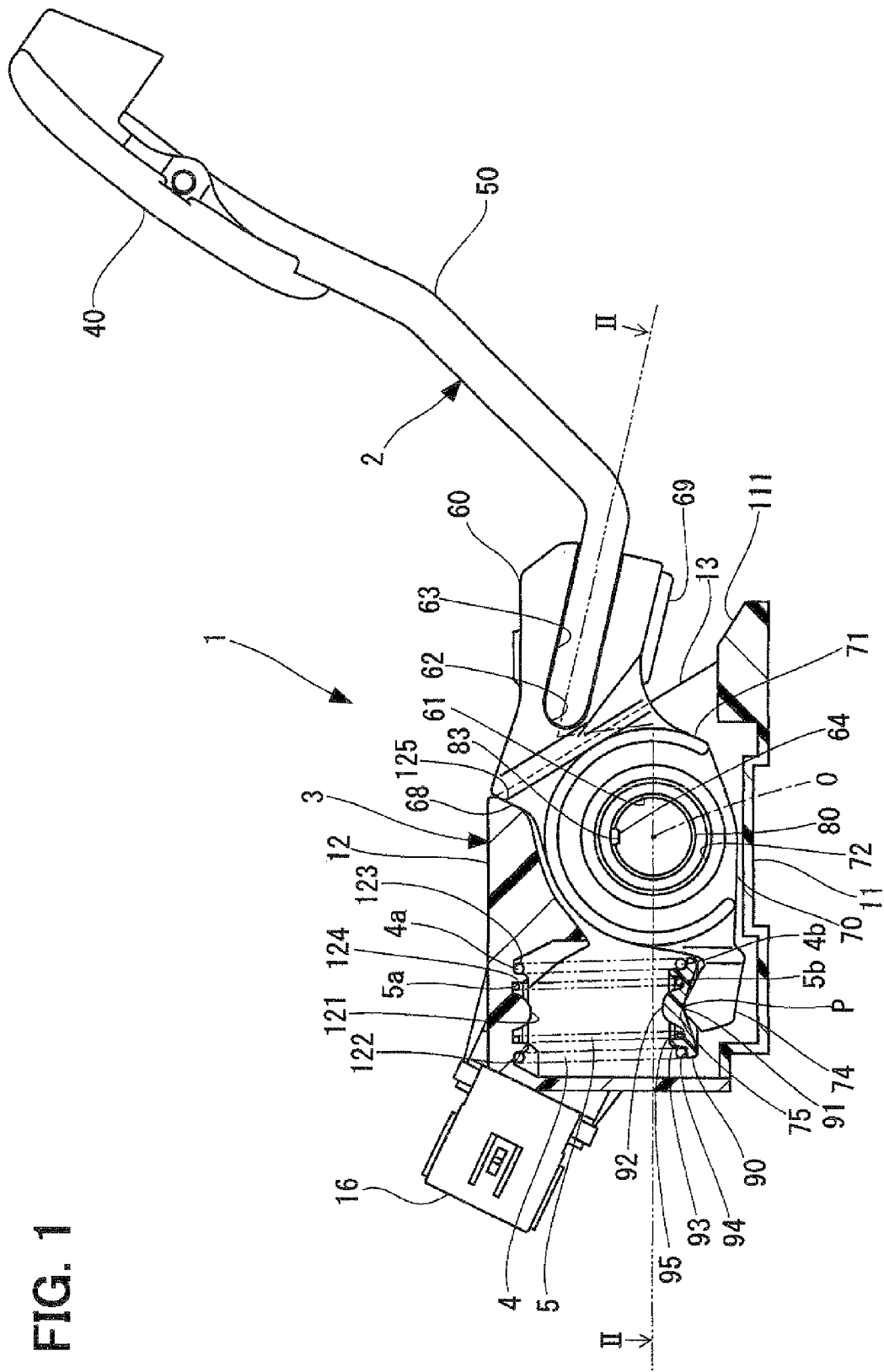
FIG. 1 is a cross-sectional view showing an accelerator pedal module according to one embodiment of the present invention.
Figure 2:
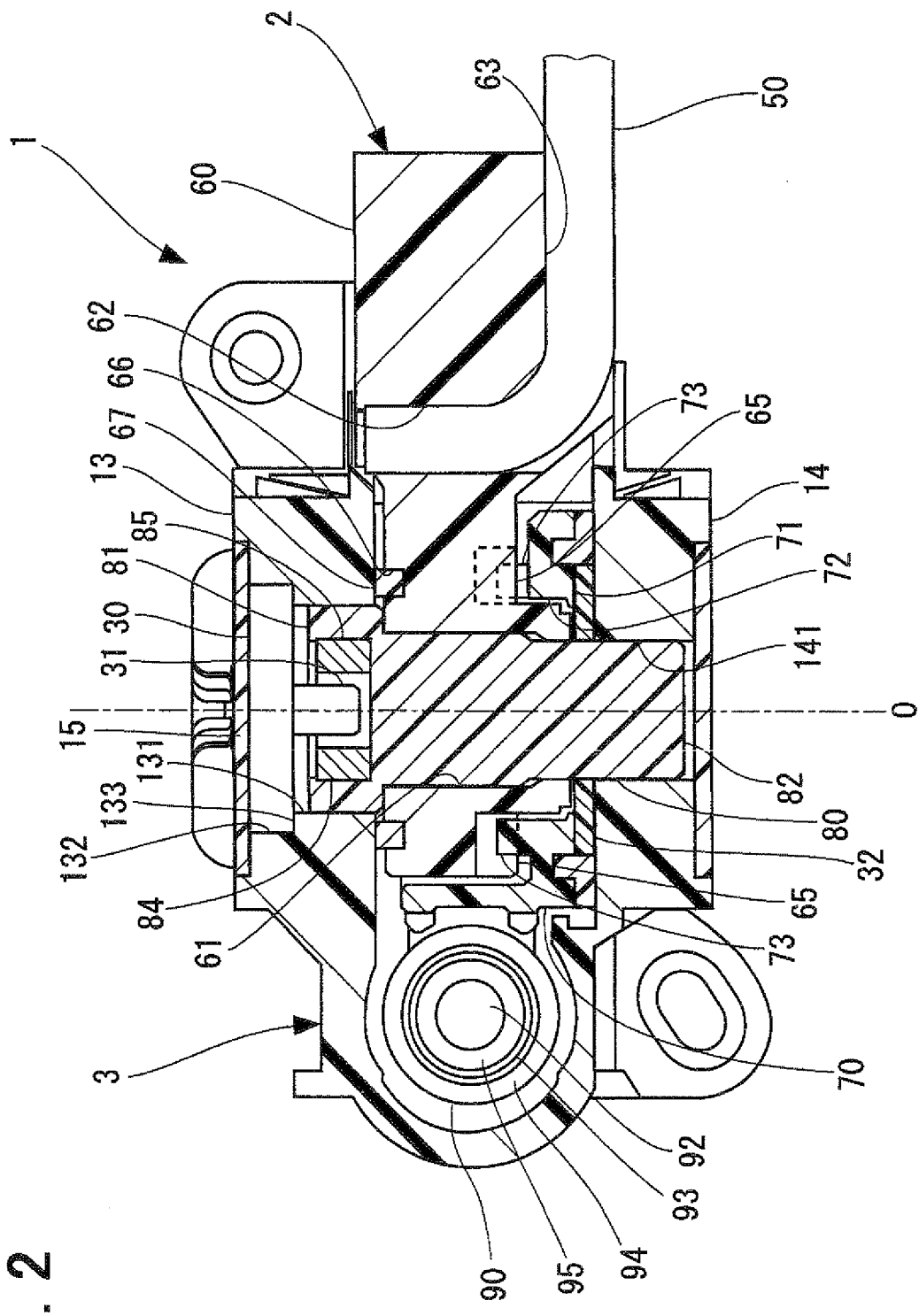
FIG. 2 is a cross-sectional view taken along a line II-II in FIG. 1.

One embodiment of the present invention will be described hereafter, with reference to the accompanying drawings. FIGS. 1 and 2 depict an accelerator pedal module according to one embodiment of the present invention. The accelerator pedal module 1 is mounted on a vehicle, to control a driving state of the vehicle in accordance with a pressing amount of the accelerator pedal 2 that is foot-actuated by a driver. The accelerator pedal module 1 according to the present embodiment adopts drive-by-wire system, and the accelerator pedal 2 is not mechanically connected with a throttle body of the vehicle. Instead, the accelerator pedal module 1 transmits a rotation angle of the accelerator pedal 2 to an engine control unit (ECU) of the vehicle, and the ECU controls the throttle body in accordance with the rotation angle.

In the accelerator pedal module 1, the accelerator pedal 2 is supported by a housing 3 to be pivotable about a rotation axis O. Moreover, two return springs 4 and 5 bias the accelerator pedal 2 via a holder 90 in a reverse of a driver's pedaling direction of the accelerator pedal 2. The rotation angle of the accelerator pedal 2, which is pivotally moved by a pedal force of the driver and biasing forces of the return springs 4 and 5, is detected by a rotation angle sensor 30, and is transmitted to the ECU.

A construction of the accelerator pedal module 1 is further described hereafter in detail. As shown in FIGS. 1 and 2, the housing 3, which serves as a support member, is formed of resin in a box-like shape. The housing 3 has a bottom plate 11, a top plate 12 that faces the bottom plate 11, and two side plates 13 and 14 that face each other and are perpendicular to the bottom plate 11 and to the top plate 12. The bottom plate 11 is fixed to a body of the vehicle with bolts, etc.

As shown in FIG. 2, a first side plate 13 has a bearing hole 131 and a sensor support hole 132. The bearing hole 131 and the sensor support hole 132 are approximately coaxially communicated with each other to pierce the first side plate 13. Both of the bearing hole 131 and the sensor support hole 132 have approximately cylindrical shapes. An inner diameter of the bearing hole 131 is smaller than an inner diameter of the sensor support hole 132. Thereby, a step portion 133 is formed between the bearing hole 131 and the sensor support hole 132. An inner circumference of the sensor support hole 132 supports the rotation angle sensor 30. The step portion 133 and a cover 15 sandwich the rotation angle sensor 30 therebetween, to prevent the rotation angle sensor 30 from coming off the sensor support hole 132. As shown in FIG. 1, a connector 16 in which a terminal (not shown) that is electrically connected with the rotation angle sensor 30 is embedded is formed on an outer wall of the housing 3.

As shown in FIG. 2, an approximately cylindrical bearing hole 141 is formed on a second side plate 14. Central axes of the bearing hole 141 and the bearing hole 131 are aligned with the rotation axis O.

As shown in FIGS. 1 and 2, the accelerator pedal 2 includes a pedal plate 40, a pedal arm 50, a pedal rotor 60, a spring rotor 70 and a shaft member 80. The pedal arm 50 is formed by bending a metal rod. The pedal plate 40, which is foot-actuated by the driver, is fixed to one end portion of the pedal arm 50.

The pedal rotor 60 is formed of resin, and has a large diameter hole 61 that pierces the pedal rotor 60. The large diameter hole 61 has an approximately cylindrical shape. The other end portion of the pedal arm 50 is bent at an approximately right angle, and is press fitted to a small diameter hole 62 and a groove 63 to be fixed to the pedal rotor 60.

The shaft member 80 is formed of resin in an approximately cylindrical shape. The shaft member 80 is inserted into the large diameter hole 61 of the pedal rotor 60. One end portion 81 of the shaft member 80 is supported by the bearing hole 131, and the other end portion 82 of the shaft member 80 is supported by the bearing hole 141. Thereby, the shaft member 80 is supported by the housing 3 to be rotatable about the rotation axis O. A groove 83 is formed on an outer circumferential wall of the shaft member 80, as shown in FIG. 1. A projection 64 that projects radially inward in a radial direction of the large diameter hole 61 is formed in the pedal rotor 60. The projection 64 is fitted to the groove 83 of the shaft member 80. Thereby, the pedal rotor 60 can rotate about the rotation axis O together with the shaft member 80. By such a construction, when the driver presses the pedal plate 40, the pedal arm 50, the pedal rotor 60 and the shaft member 80 integrally rotate about the rotation axis O.

As shown in FIG. 2, one end portion 81 of the shaft member 80 is formed in an approximately cylindrical hollow shape, to open to the rotation angle sensor 30 side. Magnet portions 84 and 85 that are opposite in polarity from each other are embedded on an inner circumferential wall of the approximately cylindrical hollow of the one end portion 81 to rotate integrally, at two points to interpose the rotation axis O therebetween. A direction of a magnetic field generated by the two magnet portions 84 and 85 changes in accordance with a rotation angle of the shaft member 80. The rotation angle sensor 30, which is supported by the sensor support hole 132 of the first side plate 13, has a Hall device or a magnetoresistive device at a tip end of a protruding portion 31 that protrudes toward the shaft member 80 side in a direction of the rotation axis O. The rotation angle sensor 30 detects the magnetic field in a noncontact manner, which is generated by the magnetic portions 84 and 85 that are located on a radially outer side of the protruding portion 31 to leave a clearance from the protruding portion 31. The rotating angle sensor 30 outputs a detection signal to the ECU that is electrically connected with the terminal (not shown). The detection signal outputted from the rotation angle sensor 30 indicates the rotation angle of the shaft member 80, i.e., the rotation angle of the accelerator pedal 2.

As shown in FIGS. 1 to 3C, the spring rotor 70, which serves as a rotor, is formed of resin, and has a circular rotating portion 71. The rotating portion 71 has a rotation hole 72 that pierces the rotating portion 71 in the direction of the rotation axis O. The rotating portion 71 is in contact with the pedal rotor 60 to be coaxially aligned with the rotation hole 72 and the large diameter hole 61. The shaft member 80 is inserted in the rotation hole 72 so that the spring rotor 70 can rotate about the rotation axis O.

Figure 3A:
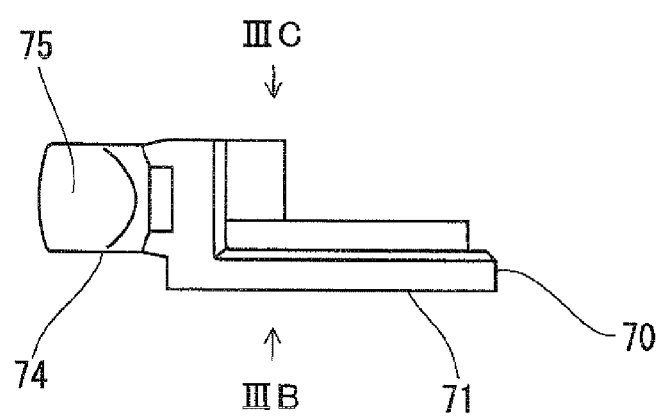
FIG. 3A is a plan view showing a rotor of the accelerator pedal module according to the one embodiment.
Figure 3B:
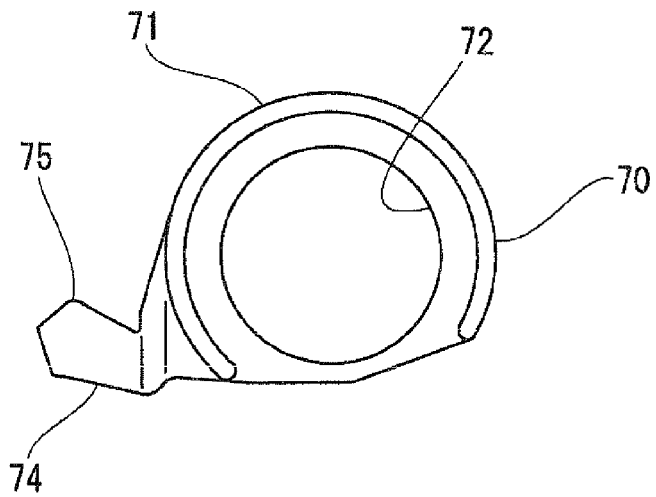
FIG. 3B is a side view of the rotor of FIG. 3A seen in a direction IIIB in FIG. 2.
Figure 3C:
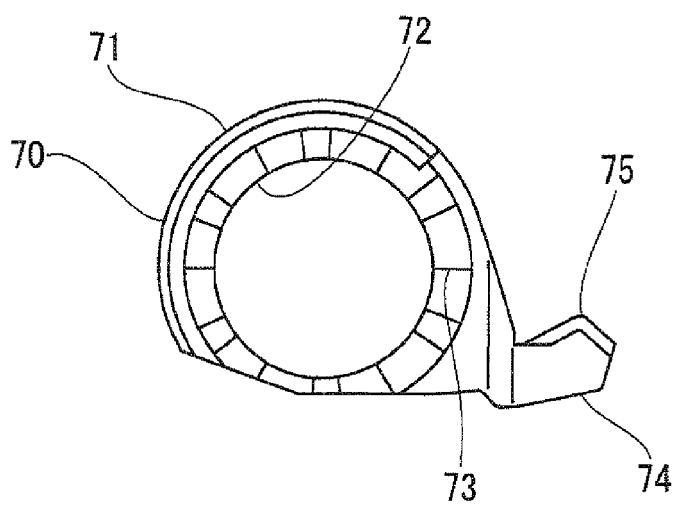
FIG. 3C is a side view of the rotor of FIG. 3A seen in a direction IIIC in FIG. 2.
Figure 4A:
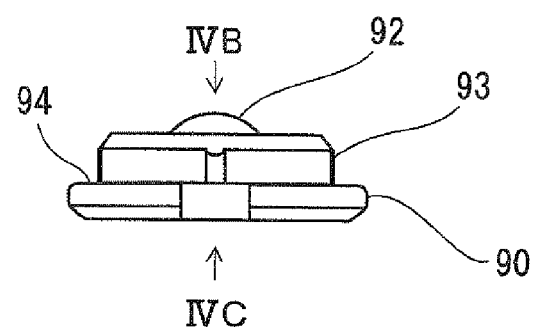
FIG. 4A is a side view showing a holder of the accelerator pedal module according to the one embodiment.
Figure 4B:
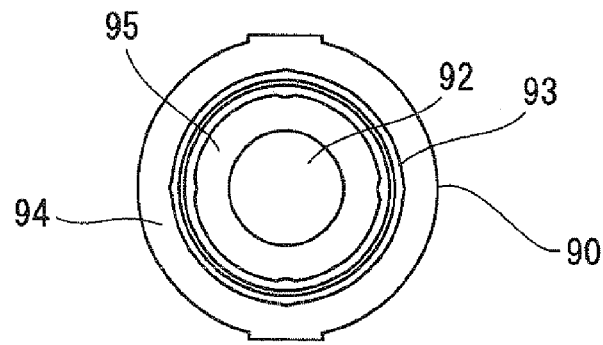
FIG. 4B is a plan view of the holder of FIG. 4A seen in a direction IVB in FIG. 4A.
Figure 4C:
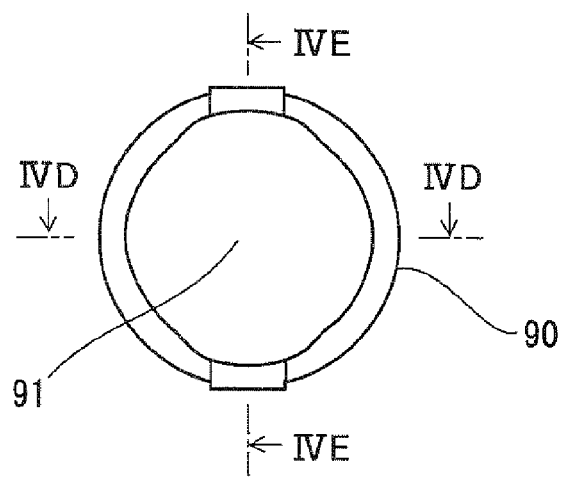
FIG. 4C is a bottom view of the holder of FIG. 4A seen in a direction IVB in FIG. 4A.
Figure 4D:
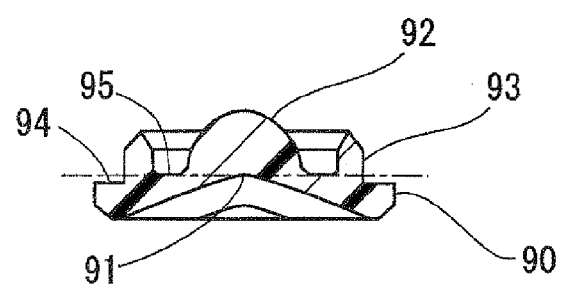
FIG. 4D is a cross-sectional view of the holder of FIG. 4A taken along a line IVD-IVD in FIG. 4C.
Figure 4E:
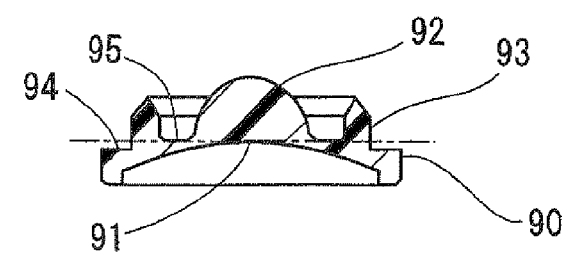
FIG. 4E is a cross-sectional view of the holder of FIG. 4A taken along a line IVE-IVE in FIG. 4C.

As shown in FIGS. 2 and 3C, several helical gear cogs 73 are formed on a pedal rotor 60 side surface of the rotating portion 71 of the spring rotor 70. The several helical gear cogs 73 are arranged at regular intervals around the rotation axis O. Several helical gear cogs 65 are formed on a rotating portion 71 side wall surface of the pedal rotor 60. The several helical gear cogs 65 are arranged at regular intervals around the rotation axis O, to be engaged with either of the helical gear cogs 73 that face the helical gear cogs 65 in the direction of the rotation axis O. By this engagement, the pedal rotor 60 and the spring rotor 70 can rotate together. For example, when the driver presses the pedal plate 40, the spring rotor 70 rotates in the pedaling direction. A friction washer 32 is interposed between a second side plate 14 side surface of the rotating portion 71 and a rotating portion 71 side wall surface of the second side plate 14. The friction washer 32 is fixed to the side plate 14 not to rotate on the second side plate 14. The friction washer 32 is in sliding contact with the rotating portion 71 to produce a frictional force. Moreover, a groove 66 is formed on a first side plate 13 side of the pedal rotor 60, and a circular friction ring 67 is press fitted in this groove 66. The friction ring 67 is in sliding contact with the first side plate 13 to produce a frictional force.

The spring rotor 70 further has a protruding portion 74 that is formed of resin integrally with the rotating portion 71. As shown in FIGS. 1 and 3A to 3C, the protruding portion 74 protrudes in a generally tangential direction from a rim portion of the rotating portion 71. The protruding portion 74 has a convex surface 75 on its top plate 12 side.

As shown in FIGS. 1, 2 and 4A to 4E, the holder 90 is formed of resin in an approximately disk-like shape, and has a concave surface 91 on its protruding portion 74 side. A material that has a low coefficient of friction such as a fluoropolymer, for example, is applied to the concave surface 91. The concave surface 91 of the holder 90 and the convex surface 75 of the spring rotor 70 are in contact with each other. A first return spring 4 and a second return spring 5, which serve as a resilient biasing member, are interposed between a top plate 12 side surface of the holder 90 and an inner wall surface of the top plate 12.

Both of the first and the second springs 4 and 5 are compression coil springs. A coil diameter of the second return spring 5 is smaller than a coil diameter of the first return spring 4. The second return spring 5 is installed inside an inner circumference of the first return spring 4.

A spherical projection 92 that spherically projects toward the top plate 12 is formed on the top plate 12 side surface of the holder 90. An annular projection 93 that annularly projects toward the top plate 12 is formed on a radially outer side of the spherical projection 92. Thereby, an annular first receiving surface 94 is formed on a radially outer side of the annular projection 93 and a second receiving surface 95 is formed between the spherical projection 92 and the annular projection 93 on the top plate 12 side surface of the holder 90.

A spherical projection 121 that spherically projects toward the holder 90 is formed on the inner wall surface of the top plate 12. An annular projection 122 that annularly projects toward the holder 90 is formed on a radially outer side of the spherical projection 121. Thereby, an annular first receiving surface 123 is formed on a radially outer side of the annular projection 122 and an annular second receiving surface 124 is formed between the spherical projection 121 and the annular projection 122 on the inner wall surface of the top plate 12.

One end portions 4a and 5a of the return springs 4 and 5 are received by the first receiving surface 123 and the second receiving surface 124 of the top plate 12, respectively. The other end portions 4b and 5b of the return springs 4 and 5 are received by the first receiving surface 94 and the second receiving surface 95 of the holder 90, respectively. In this way, the return springs 4 and 5 bias the pedal arm 50 and the spring rotor 70, which has been rotated in the pedaling direction, via the holder 90 in the reverse of the pedaling direction. The spring rotor 70 receives a total biasing force Fs of the return springs 4 and 5 at the protruding portion 74, to rotate.

Figure 5:
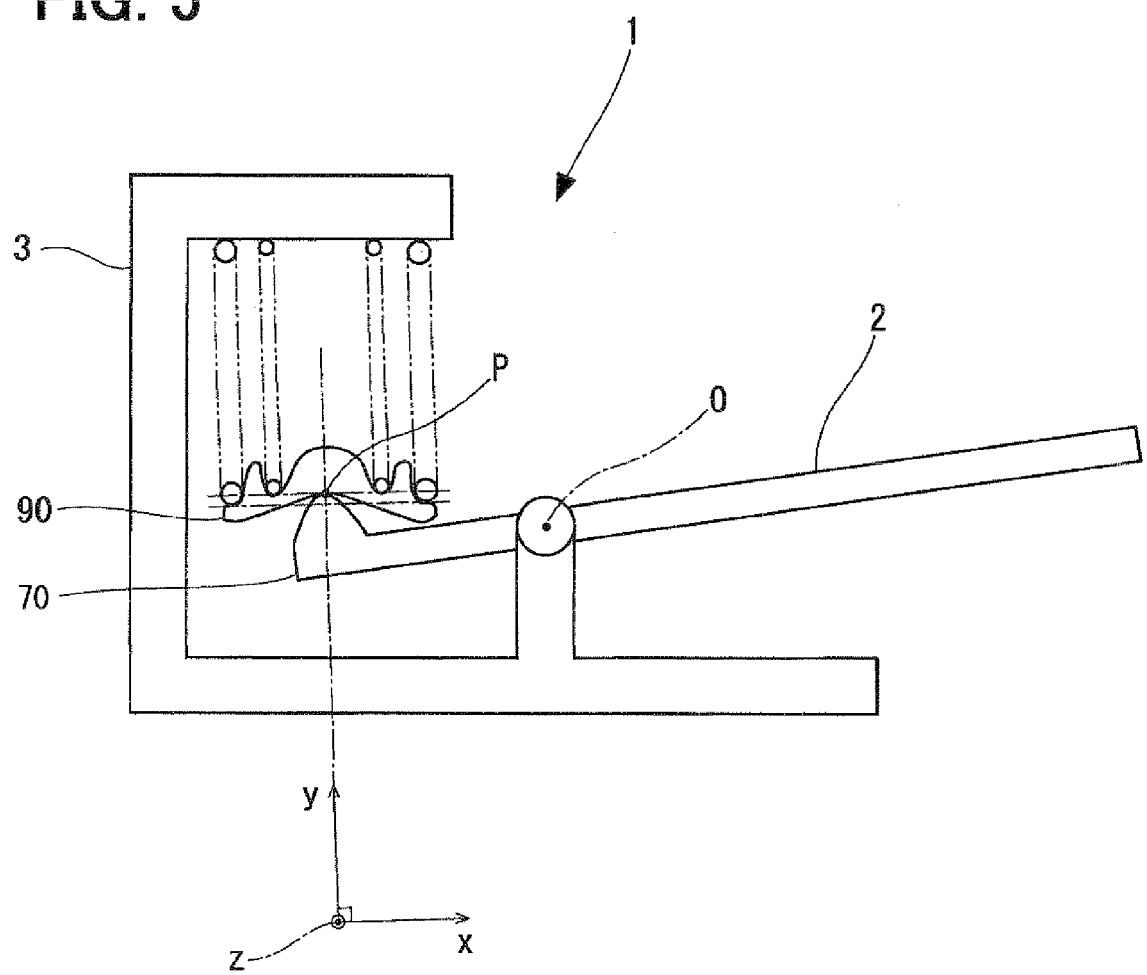
FIG. 5 is a schematic diagram of the accelerator pedal module according to the one embodiment.
Figure 6A:
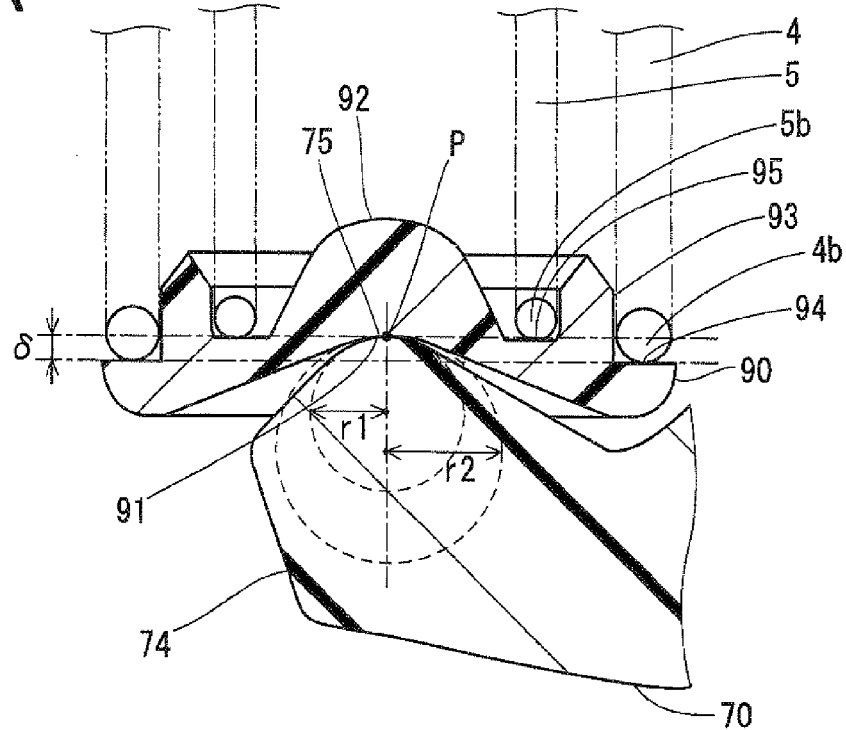
FIG. 6A is an enlarged cross-sectional view of the rotor and the holder of the accelerator pedal module according to the one embodiment.
Figure 6B:
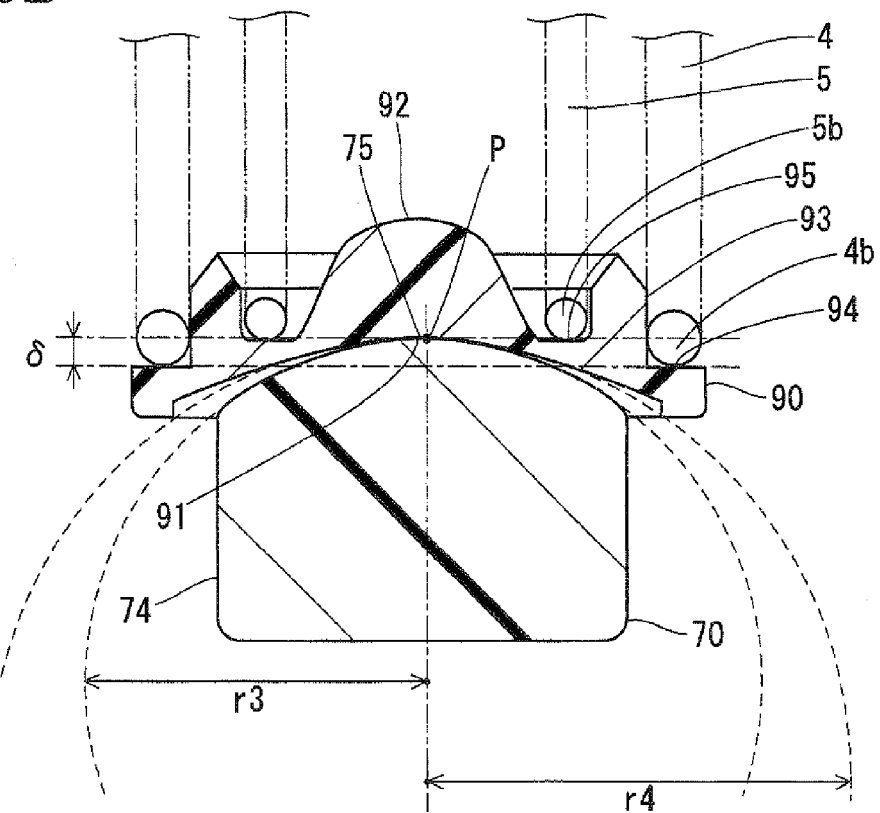
FIG. 6B is another enlarged cross-sectional view of the rotor and the holder of the accelerator pedal module according to the one embodiment.

Next, cross-sectional shapes of the spring rotor 70 and the holder 90 will be described in detail. As shown in FIG. 5, a coordinate system is defined in which z-axis is in parallel with the rotation axis O of the accelerator pedal 2, y-axis is in parallel with a direction in which the return springs 4 and 5 can be expanded and compressed, and x-axis is perpendicular to both of z-axis and y-axis. FIG. 6A depicts cross sections of the spring rotor 70 and the holder 90 on xy plane that contains a contact point P of the spring rotor 70 and the holder 90. FIG. 6B depicts cross sections of the spring rotor 70 and the holder 90 on yz plane that contains the contact point P.

As shown in FIG. 6A, on the xy plane that contains the contact point P, a radius of curvature r1 of the cross section of the convex surface 75 of the spring rotor 70 in a proximity of the contact point P is smaller than a radius of curvature r2 of the cross section of the concave surface 91 of the holder 90 in the proximity of the contact point P. Moreover, as shown in FIG. 6B, on the yz plane that contains the contact point P, a radius of curvature r3 of the cross section of the convex surface 75 of the spring rotor 70 in the proximity of the contact point P is smaller than a radius of curvature r4 of the cross section of the concave surface 91 of the holder 90 in the proximity of the contact point P. Furthermore, the radius of curvature r2 is smaller than the radius of curvature r3. That is, the curvature radii r1 to r4 satisfy a relationship of $r4 > r3 > r2 > r1$.

Moreover, as shown in FIGS. 6A and 6B, the first receiving surface 94 of the holder 90 is located closer to the bottom plate 11 than the contact point P is, by a height δ. That is, the other end portion 4b of the return spring 4 is located closer to the bottom plate 11 than the contact point P is. The second receiving surface 95 of the holder 90 is located approximately as close to the bottom plate 11 as the contact point P is, or is located closer to the bottom plate 11 than the contact point P is.

Next, an operation of the accelerator pedal module 1 will be described.

As shown in FIG. 1, before the driver presses the pedal plate 40 of the accelerator pedal 2, the biasing forces of the return springs 4 and 5 bias the accelerator pedal 2 in the reverse of the pedaling direction. At this time, a contact portion 68 of the pedal rotor 60 is in contact with a stopper 125 that is formed on the top plate 12.

When the driver presses the pedal plate 40 of the accelerator pedal 2 and adjusts a pressing amount of the accelerator pedal 2, the pedal rotor 60 and the spring rotor 70, of which the helical gear cogs 65 and the helical gear cogs 73 are engaged with each other, integrally rotate, so that the spring rotor 70 is in sliding contact with the friction washer 32 and the first side plate 13 is in sliding contact with the friction ring 67. At this time, the rotation angle sensor 30 detects the rotation angle of the shaft member 80 that rotates integrally with the pedal rotor 60, in accordance with the magnetic field that is generated by the magnet portions 84 and 85.

When the driver increases the pedal force, the pedal rotor 60 and the spring rotor 70 rotate in the pedaling direction. In accordance with the rotation of the pedal rotor 60 and the spring rotor 70, the total biasing force $F_s$ of the return springs 4 and 5 and the frictional force $F_{f1}$ produced by the friction between the spring rotor 70 and the friction washer 32 act on the spring rotor 70 in the reverse of the pedaling direction. The frictional force $F_{f2}$ produced by the friction between the friction ring 67 and the first side plate 13 acts on the pedal rotor 60 in the reverse of the pedaling direction. At this time, the total biasing force $F_s$ of the return springs 4 and 5 increases as the return springs 4 and 5 are compressed in accordance with the pressing amount of the accelerator pedal 2. At this time, an engagement of the helical gear cogs 65 and the helical gear cogs 73 increases a force to separate the pedal rotor 60 from the rotating portion 71 of the spring rotor 70 in the direction of the rotation axis O, to increase the frictional forces $F_{f1}$ and $F_{f2}$.

When the driver increases the pedal force further, the pedal rotor 60 rotates further in the pedaling direction, and a contact portion 69 of the pedal rotor 60 comes in contact with a stopper 111 that is formed on the bottom plate 11. The contact portion 69 comes in contact with the stopper 111, to prevent the accelerator pedal 2 from rotating further.

When the driver decreases the pedal force, the pedal rotor 60 and the spring rotor 70 rotate in the reverse of the pedaling direction, due to the total biasing force $F_s$ of the return springs 4 and 5. In accordance with the rotation of the pedal rotor 60 and the spring rotor 70, the frictional force $F_{f1}$ between the spring rotor 70 and the friction washer 32 acts on the spring rotor 70 in a reverse of the total biasing force $F_s$, i.e., in the pedaling direction. The frictional force $F_{f2}$ between the friction ring 67 and the first side plate 13 acts on the pedal rotor 60 in the pedaling direction. In accordance with a return of the accelerator pedal 2, the return springs 4 and 5 expands, decreasing the total biasing force $F_s$. At this time, the engagement of the helical gear cogs 65 and the helical gear cogs 73 decreases the force to separate the pedal rotor 60 from the rotating portion 71 of the spring rotor 70 in the direction of the rotation axis O, to decrease the frictional forces $F_{f1}$ and $F_{f2}$. As explained above, the accelerator pedal module 1 has a pedal force characteristic with hysteresis, that is, the pedal force in pedaling time is not equal to the pedal force in returning time. Therefore, it is easy to hold the accelerator pedal 2 at a certain position.

Figure 7:
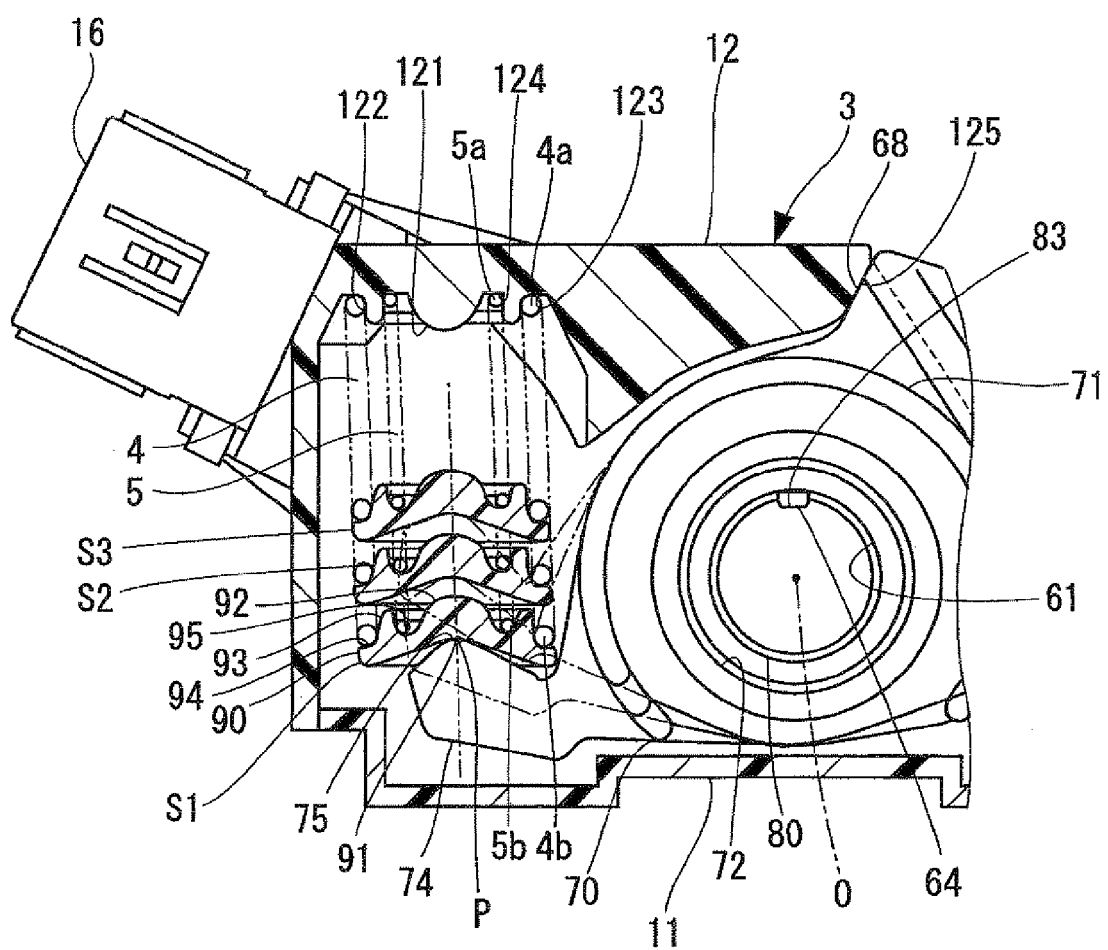
FIG. 7 is a partial cross-sectional view showing the accelerator pedal module according to the one embodiment.

A referential numeral S1 in FIG. 7 denotes a state of the holder 90 in which the contact portion 68 is in contact with the stopper 125 before the accelerator pedal 2 is pressed by the driver. A referential numeral S2 in FIG. 7 denotes a state of the holder 90 in which the accelerator pedal 2 is pressed partway by the driver. A referential numeral S3 in FIG. 7 denotes a state of the holder 90 in which the contact portion 69 is in contact with the stopper 111 after the accelerator pedal 2 is pressed to the maximum by the driver. In this way the accelerator pedal 2 can rotate within a range from a position at which the contact portion 68 is in contact with the stopper 125 to a position at which the contact portion 69 comes in contact with the stopper 111.

As shown in FIG. 6A, the radius of curvature r1 of the cross section of the convex surface 75 of the spring rotor 70, which is taken on the xy plane, is set to be relatively small. Therefore, as shown in FIG. 7, while the protruding portion 74 of the spring rotor 70 moves along an arc to push up the holder 90 in accordance with a driver's pedaling operation of the accelerator pedal 2, the contact point P of the spring rotor 70 and the holder 90 deviates little in a direction of x-axis. Thereby, the holder 90 is linearly pushed up by the protruding portion 74. As a result, the return springs 4 and 5 are compressed linearly.

In the accelerator pedal module 1 according to the above-described embodiment of the present invention, the radius of curvature r1 of the cross section of the convex surface 75 of the spring rotor 70, which is taken on the xy plane, is set to be relatively small. Thereby, although the protruding portion 74 of the spring rotor 70 moves along an arc, the contact point P of the spring rotor 70 and the holder 90 deviates little in the direction of x-axis. Therefore, the holder 90 is linearly pushed up by the spring rotor 70 while the driver performs a pedaling operation. As a result, the return springs 4 and 5 are linearly compressed, to improve operating efficiencies of the return springs 4 and 5. Therefore, a pedal operation feeling of the accelerator pedal 2 becomes good.

Moreover, while the spring rotor 70 pushes up the holder 90 in accordance with the pedaling operation of the accelerator pedal 2, the protruding portion 75 of the spring rotor 70 is in sliding contact with the concave surface 91 of the holder 90 to push up the holder 90. In the accelerator pedal module 1 according to the above embodiment of the present invention, the radius of curvature r3 of the cross section of the convex surface 75 of the spring rotor 70, which is taken on the yz plane, in the proximity of the contact point P, is set to be larger than the radius of curvature r1. Thereby, a contact pressure of the holder 90 and the spring rotor 70 can be relatively small. Therefore, local wears of the holder 90 and the spring rotor 70 due to the sliding contact of the holder 90 and the spring rotor 70 can be reduced.

Furthermore, in the accelerator pedal module 1 according to the above embodiment of the present invention, the other end portion 4b of the return spring 4 is located closer to the bottom plate 11 than the contact point P is. That is, a point of application of the biasing force of the return spring 4 to the holder 90 is located closer to the bottom plate 11 than the contact point P is. Therefore, while the spring rotor 70 pushes up the holder 90 against the biasing force of the spring in accordance with the pedaling operation of the accelerator pedal 2, an orientation of the holder 90 is stable. Thereby, the accelerator pedal module 1 according to the present embodiment does not especially require a member for guiding a movement of the holder 90. Therefore, it is possible to prevent a one-sided wear of the holder 90, which is caused by a guide member of the holder 90 with time. Therefore, it is possible to keep a good pedal operation feeling of the accelerator pedal 2.

In the accelerator pedal module 1 according to the above embodiment of the present invention, a material that has a low coefficient of friction such as a fluoropolymer is applied to the concave surface 91 of the holder 90. That is, the concave surface 91 of the holder 90 is surface treated to make its coefficient of friction smaller than a coefficient of friction of a material that forms the spring rotor 70. Therefore, when the convex surface 75 of the spring rotor 70 slides on the concave surface 91 of the holder 90, a frictional resistance that acts between the convex surface 75 and the concave surface 91 is small. Therefore, local wears of the spring rotor 70 and the holder 90 can be reduced.

(Other Embodiments)

As other embodiments of the present invention, a pedal plate, a pedal arm, a pedal rotor and a shaft member may be formed of resin, etc. in a single piece, and an accelerator pedal may be formed by assembling the single piece with a separate spring rotor, for example. Instead, it is also possible to form all the parts that compose the accelerator pedal in a single piece of resin.

Furthermore, as still another embodiment of the present invention, the material that has a low coefficient of friction such as a fluoropolymer may be applied not only to the concave surface of the holder but also to the convex surface of the spring rotor. It is also possible to apply fluoropolymer, etc. not to the concave surface but only to the convex surface. Moreover, it is also possible to make any one of the holder and the spring rotor of a fluoropolymer, etc.

Additional advantages and modifications will readily occur to those skilled in the art. The invention in its broader terms is therefore not limited to the specific details, representative apparatus, and illustrative examples shown and described.

What is claimed is:

1. Accelerator pedal module comprising:
    a support member that is adapted to be fixed to a body of a vehicle;
    an accelerator pedal that is engaged with the support member rotatably and pressed by a driver;
    a spring having one end that is received by the support member and biases the accelerator pedal in a direction opposite to a pressing direction of the accelerator pedal;
    a rotor that is arranged on an end of the accelerator pedal on a spring side and has a convex surface; and
    a holder that is interposed between the spring and the rotor, has a concave surface contacting the convex surface, and receives the other end of the spring, wherein:
    the holder includes a receiving portion that receives the other end of the spring, the receiving portion is disposed farther from the one end of the spring, along an expansion direction of the spring, than a contact point at which the convex surface of the rotor and the concave surface of the holder contact each other, and the receiving portion is perpendicular to a bias direction of the spring;
    the other end of the spring is received by the receiving portion so that the other end of the spring is farther from the one end of the spring, along the expansion direction of the spring, than the contact point;
    a rotation axis direction of the accelerator pedal is defined as Z axis, the expansion direction of the spring is defined as Y axis, and a direction perpendicular to both of the Z axis and the Y axis is defined as X axis;
    a radius of curvature of a cross section of the convex surface in a proximity of the contact point on a X-Y plane containing the contact point is defined as r1;
    a radius of curvature of a cross section of the concave surface in the proximity of the contact point on the X-Y plane containing the contact point is defined as r2;
    a radius of curvature of the cross section of the convex surface in the proximity of the contact point on a Y-Z plane containing the contact point is defined as r3;
    a radius of curvature of the cross section of the concave surface in the proximity of the contact point on the Y-Z plane containing the contact point is defined as r4;
    a relationship of r4>r3>r2>r1 is satisfied; and
    the holder is movable with the other end of the spring without directly contacting the support member.

2. The accelerator pedal module according to claim 1, wherein:
    a material that has a friction coefficient smaller than a material of the rotor or the holder is applied to at least one of the convex surface and the concave surface.

3. The accelerator pedal module according to claim 1, wherein:
    one of the rotor and the holder is made of a material that has a friction coefficient smaller than a material of the other of the rotor and the holder.

4. The accelerator pedal module according to claim 2, Wherein:
    one of the rotor and the holder is made of a material that has a friction coefficient smaller than a material of the other of the rotor and the holder.

5. The accelerator pedal module according to claim 1, wherein:
    the rotor is supported by the support member to be rotatable around a rotation axis;
    the accelerator pedal is engaged with the rotor so that the accelerator pedal is pivotable around the rotation axis in a first pivot direction when the driver applies a pedal force to the accelerator pedal;
    the spring is a resilient biasing member that is arranged to be compressible on a biasing axis that is generally tangential to an arc path, along which a protrusion of the rotor passes when the rotor rotates around the rotation axis, to bias the accelerator pedal in a second pivot direction, which is opposite from the first pivot direction; and
    the holder is interposed between the protrusion of the rotor and the other end of the resilient biasing member, which is opposite from the one end of the resilient biasing member;
    the concave surface is located on a central portion of a first side of the holder and contacts the protrusion of the convex surface at the contact point;
    the receiving portion is located on a peripheral portion of a second side of the holder, which is opposite from the first side of the holder;
    the contact point is located between the other end and the one end of the resilient biasing member;
    the concave surface of the holder and the convex surface of the protrusion are curved to satisfy the relationship of r4>r3>r2>r1.

* * * * *